United States Patent

Seaman et al.

(10) Patent No.: US 10,937,254 B2
(45) Date of Patent: *Mar. 2, 2021

(54) ADJUSTING COMPONENTS OF CARGO TRANSPORTATION UNITS

(71) Applicant: BlackBerry Limited, Waterloo (CA)

(72) Inventors: Conrad Delbert Seaman, Ottawa (CA); Stephen West, Manotick (CA); Prabhul Dev, Ottawa (CA)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/547,145

(22) Filed: Aug. 21, 2019

(65) Prior Publication Data

US 2020/0051344 A1    Feb. 13, 2020

Related U.S. Application Data

(63) Continuation of application No. 15/456,974, filed on Mar. 13, 2017, now Pat. No. 10,395,437.

(51) Int. Cl.
G07C 5/00 (2006.01)
B60W 50/038 (2012.01)
B60W 50/029 (2012.01)

(52) U.S. Cl.
CPC .......... *G07C 5/006* (2013.01); *B60W 50/029* (2013.01); *B60W 50/038* (2013.01); *G07C 5/008* (2013.01); *B60W 2050/0292* (2013.01)

(58) Field of Classification Search
CPC ..... G07C 5/006; G07C 5/008; B60W 50/038; B60W 50/029; B60W 2050/0292
See application file for complete search history.

(56) References Cited

U.S. PATENT DOCUMENTS

| | | |
|---|---|---|
| 3,412,876 A | 11/1968 | Calabrese |
| 4,780,043 A | 10/1988 | Fenner et al. |
| 4,964,679 A | 10/1990 | Rath |
| 5,015,145 A | 5/1991 | Angell et al. |
| 5,470,134 A | 11/1995 | Toepfer |
| 5,655,788 A | 8/1997 | Peaker |
| 5,959,365 A | 9/1999 | Mantini |
| 6,290,277 B1 | 9/2001 | Spykerman et al. |
| 6,754,485 B1 * | 6/2004 | Obradovich ........... G01C 21/26 455/414.1 |
| 6,847,892 B2 * | 1/2005 | Zhou ..................... G01S 5/0027 340/426.1 |

(Continued)

FOREIGN PATENT DOCUMENTS

| | | |
|---|---|---|
| AU | 2015100473 | 5/2015 |
| CN | 204528507 | 8/2015 |

OTHER PUBLICATIONS

European Patent Office, Extended European Search Report for Appl. No. 18767497.3 dated Feb. 5, 2020 (10 pages).

(Continued)

*Primary Examiner* — Richard M Camby
(74) *Attorney, Agent, or Firm* — Trop, Pruner & Hu, P.C.

(57) ABSTRACT

In some examples, a controller detects a compromised condition of a component of a cargo transportation unit (CTU), determines a time of performing a next maintenance of the CTU, and controls adjustment of the component in response to detecting the compromised condition and based on the time of performing the next maintenance of the CTU.

20 Claims, 3 Drawing Sheets

(56) References Cited

U.S. PATENT DOCUMENTS

| | | | |
|---|---|---|---|
| 6,876,908 B2 | 4/2005 | Cramer | |
| 7,011,186 B2 | 3/2006 | Frentz | |
| 7,412,307 B2 * | 8/2008 | Pillar | B65F 3/00 180/281 |
| 7,483,774 B2 | 1/2009 | Grichnik | |
| 7,694,555 B2 | 4/2010 | Howell | |
| 8,123,281 B2 | 2/2012 | Perkins et al. | |
| 8,205,741 B2 | 6/2012 | Swinderman | |
| 8,874,305 B2 | 10/2014 | Dolgov | |
| 9,256,852 B1 * | 2/2016 | Myllymaki | B60P 3/007 |
| 9,342,933 B2 | 5/2016 | Olsen, III et al. | |
| 9,352,752 B2 | 5/2016 | Cullinane | |
| 9,511,779 B2 | 12/2016 | Cullinane | |
| 9,791,861 B2 | 10/2017 | Keohane | |
| 9,881,427 B2 | 1/2018 | Barajas Gonzalez | |
| 10,395,437 B2 * | 8/2019 | Seaman | G07C 5/008 |
| 2004/0069850 A1 | 4/2004 | De Wilde | |
| 2005/0261818 A1 | 11/2005 | Brown | |
| 2006/0131950 A1 | 6/2006 | Larson | |
| 2008/0154459 A1 | 6/2008 | Grichnik | |
| 2011/0084162 A1 | 4/2011 | Goossen et al. | |
| 2011/0101257 A1 * | 5/2011 | Morris | B60G 17/0525 251/129.01 |
| 2011/0175301 A1 | 7/2011 | Naber | |
| 2012/0083959 A1 * | 4/2012 | Dolgov | B60T 17/18 701/23 |
| 2014/0372182 A1 | 12/2014 | Groble | |
| 2015/0094898 A1 | 4/2015 | Tellis | |
| 2015/0284009 A1 | 10/2015 | Cullinane | |
| 2016/0075332 A1 | 3/2016 | Edo-Ros | |
| 2016/0200326 A1 | 7/2016 | Cullinane | |
| 2017/0004461 A1 | 1/2017 | Akselrod | |
| 2017/0021687 A1 | 1/2017 | Youngers | |
| 2017/0123429 A1 | 5/2017 | Levinson | |
| 2017/0139412 A1 | 5/2017 | Keohane | |
| 2017/0213165 A1 | 7/2017 | Stauffer | |
| 2017/0334290 A1 * | 11/2017 | Homsangpradit | B60W 30/02 |
| 2017/0364869 A1 | 12/2017 | Tarte | |
| 2018/0134161 A1 | 5/2018 | Gaither | |
| 2018/0186208 A1 | 7/2018 | Coombs | |

OTHER PUBLICATIONS www.autoflexsuspensions.com/autoflex/—Auto Flex—Air Ride Suspension System dated on or before Nov. 13, 2016 (2 pages).
VSE—Dynamic Truck and Trailer Suspension DTS Suspension, Advanced Steering & Suspension Solutions, Version 2009 (24 pages).
www.kudauk.ltd.uk/shop/truck-aerodynamics/lasereye-auto-spoiler-adjustment- --LaserEye, Automatic Truck Spoiler, Roof Deflector Adjustment System dated on or before Nov. 13, 2016 (7 pages).
www.psitireinflation.com/how-atis-works—P.S.I. The Inflation System—How Automatic Tire Inflation Systems Work, 2015 (2 pages).
www.truckingefficiency.org/tire-pressure-inflation-trailer—Tire Pressure Inflation Systems (Trailers) dated on or before Nov. 13, 2016 (11 pages).
Dronelife News, 5 Reasons Drones Will Change the Future of Cargo, Aug. 11, 2014 (9 pages).
Insurance Journal, First Licensed Autonomous Freight Truck Hits the Road in U.S., May 6, 2015 (8 pages).
Petersen, Ryan, Crunch Network, The driverless truck is coming, and it's going to automate millions of jobs, Apr. 25, 2016 (12 pages).
www.platformuca.org/—The Platform for Unmanned Cargo Aircraft (PUCA), 2016 (2 pages).
Seaman et al., U.S. Appl. No. 15/388,491 entitled Controlling Access to Compartments of a Cargo Transportation Unit filed Dec. 22, 2016 (32 pages).
Seaman et al., U.S. Appl. No. 15/254,654 entitled Improving Efficiency of a Cargo Shipping System filed Sep. 1, 2016 (51 pages).
Seaman et al., U.S. Appl. No. 15/388,479 entitled Adjusting Mechanical Elements of Cargo Transportation Units filed Dec. 22, 2016 (31 pages).
ISA/CA, International Search Report and Written Opinion for PCT/CA2018/050285 dated Jun. 21, 2018 (7 pages).

* cited by examiner

ADJUSTING COMPONENTS OF CARGO TRANSPORTATION UNITS

CROSS REFERENCE TO RELATED APPLICATION

This is a continuation of U.S. application Ser. No. 15/456,974, filed Mar. 13, 2017, U.S. Pat. No. 10,395,437, which is hereby incorporated by reference.

BACKGROUND

Trucks, tractor-trailers, or tractors that are connected to chassis for carrying containers can be used to transport cargo that includes goods. Cargo can be transported from an origin (such as a factory, a warehouse, a retail outlet, etc.) to a destination (such as retail outlet, a warehouse, customer premises, etc.) along a route. Components of trailers or other cargo transportation units that carry cargo can wear down over time, or can experience faulty operation. Such worn components or faulty components may prevent the trailers or other cargo transportation units from operating properly.

BRIEF DESCRIPTION OF THE DRAWINGS

Some implementations of the present disclosure are described with respect to the following figures.

Figure 1:
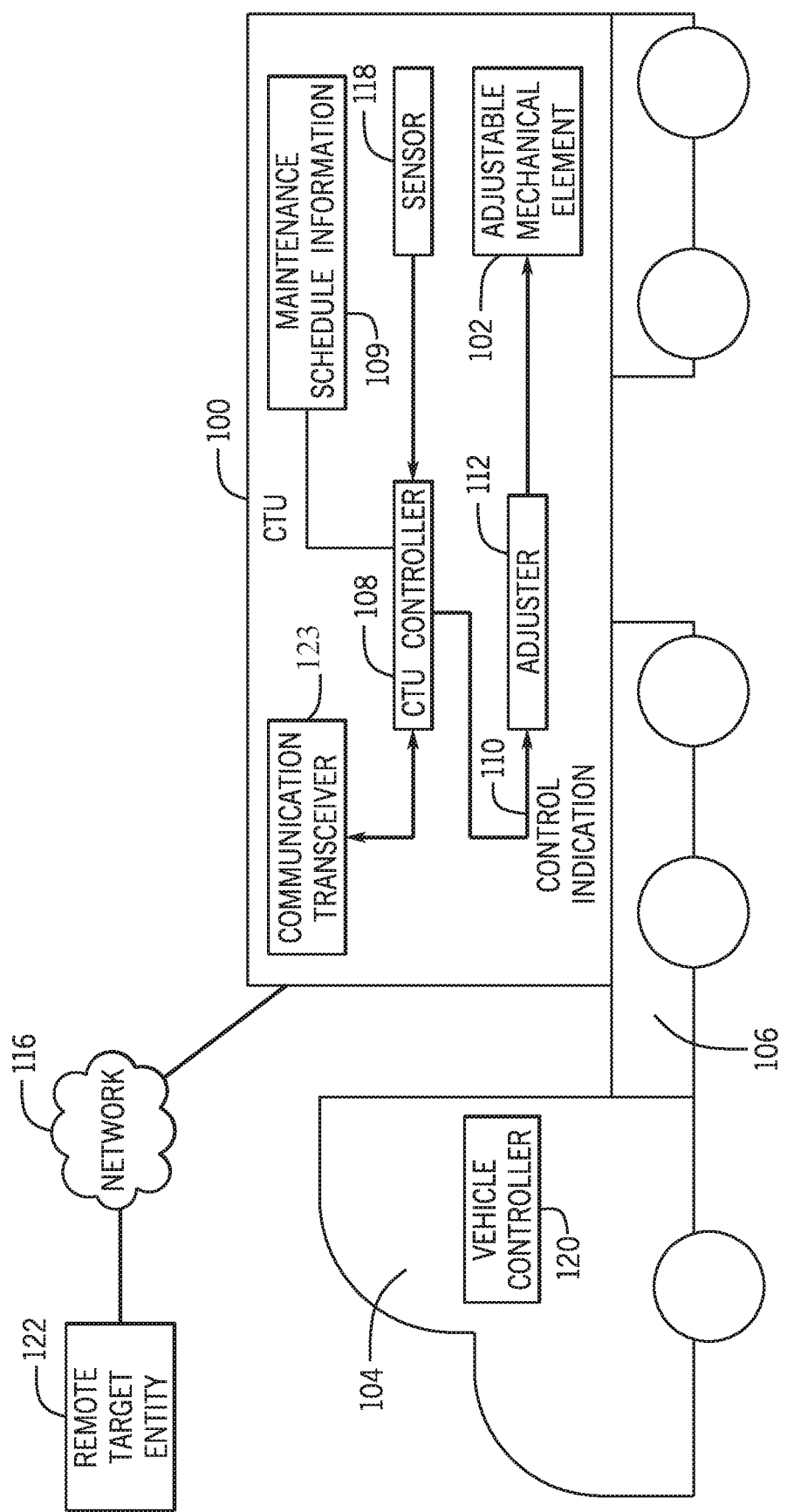
FIG. 1 is a block diagram of an example arrangement including a cargo transportation unit (CTU) and a vehicle attached to the CTU, according to some implementations.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A cargo transportation unit (CTU) in the form of a moveable platform can be used to carry cargo items between different geographic locations. A "cargo item" can refer to any physical item that is to be delivered from one location to another location. "Cargo" can refer to one or more cargo items. In some examples, a CTU can be a container (that is attached to a tractor), a cargo carrying portion of a truck, or a trailer, where the container provides an enclosed space in which the physical items can be stored during shipment. In other examples, the CTU can include another type of carrier structure that is able to carry cargo items. More generally, the CTU can be part of, mounted on, or attached as, applicable, to a vehicle, such as a truck, a trailer, a tractor, a car, a railed vehicle (e.g., a train), a watercraft (e.g., a ship), an aircraft, a spacecraft, and so forth. The vehicle can haul the CTU that is part of, mounted on, or attached to the vehicle.

In some examples, a vehicle to which a CTU is attached to, mounted on, or part of, can be a driverless vehicle that can be self-driving. A driverless vehicle (also referred to as an "autonomous vehicle") refers to a vehicle that is without a driver, i.e., a human that controls the movement of the vehicle while the driver is located on the vehicle. A self-driving or autonomous vehicle has the intelligence and self-awareness to perform driving tasks, including driving itself from an origin to a destination, without any human driver on the vehicle.

Without the presence of a human driver, a CTU that is attached to, mounted on, or part of an unmanned vehicle may not be properly maintained or configured. Typically, when a CTU is associated with a vehicle that has a human driver, the human driver can perform checks of the CTU (such as before a trip begins, at specified points during a trip, at specified maintenance times, or at other times) to ensure that various components of the CTU are properly maintained or configured. Examples of such components can include any or some combination of the following: a tire, a wheel, a suspension, an aerodynamic shroud, a door lock, a brake, a seal, and so forth. The foregoing example components are examples of adjustable mechanical elements that can be adjusted to different states. Although example adjustable components are listed, it is noted that in other examples, additional or alternative adjustable components can be employed in a CTU. More generally, an "adjustable component" of a CTU can refer to any adjustable component that is part of the CTU or that otherwise affects the operation of the CTU.

As examples, a human driver can perform checks of the CTU's tires, such as to determine whether the tires are inflated to a target pressure and to check the wear of the tires. Improperly maintained tires of the CTU can present a dangerous condition, since incorrectly inflated tires and/or tires with excessive wear may cause a CTU to lose control while traveling on a road, which can lead to accidents that can cause injury to humans and/or cause damage to the cargo carried by the CTU. Furthermore, incorrectly inflated tires and/or excessively worn tires can lead to inefficient operation of the CTU. For example, under-inflated tires results in increased friction between the tires and the road, which can lead to reduced gas mileage of the vehicle.

The CTU can include other adjustable components that if not properly maintained or configured can lead to dangerous conditions (such as due to a tire blowout or brake failure) or less efficient operation of the CTU.

In accordance with some implementations of the present disclosure, in response to detecting a compromised condition of a component of a CTU, a CTU controller can determine a time of performing a next maintenance of the CTU, and can control adjustment of the component in response to detecting the compromised condition and based on the time of performing the next maintenance of the CTU. A "compromised condition" of a component can refer to any condition of the component that prevents the component from achieving operational behavior according to a target goal or specification. For example, the compromised condition can be a result of wear of the component. In other examples, the compromised condition can be a result of fault associated with the component. A goal of some implementations of the present disclosure is to extend the performance of the CTU to the next maintenance of the CTU, or to help finish a current delivery of cargo and then immediately schedule the service for the CTU, while avoiding a dead or damaged CTU on the road. It is desirable to be able to finish a current delivery with as little damage as possible to the CTU due to the compromised condition of a component (or multiple components), and to return the CTU to a home location or other target location so that the appropriate maintenance can be performed on the CTU.

Maintenance on a CTU can refer to any action taken on the CTU to service one or more components of the CTU, such as by replacing or repairing component(s), refilling fluid(s), such as a brake fluid, a transmission fluid, an engine fluid, etc., of the CTU, checking for wear and tear of component(s), or any other action that checks, repairs, or addresses an operational status of component(s) of the CTU.

A time of performing a next maintenance of the CTU can refer to a pre-scheduled time, such as a regularly scheduled time for performing maintenance of the CTU (e.g., performing maintenance after passage of a specified time interval, performing maintenance after a specified distance has been travelled by the CTU, etc.). Alternatively, a time of performing maintenance of a CTU can refer to a time that is requested or set on demand, such as in response to detecting a compromised condition of a component. The time of the next maintenance of the CTU can be based on an amount of time for the CTU to travel to a service facility, and the time that the service facility is available to receive the CTU for maintenance. In the latter examples, the time of performing the next maintenance of the CTU can be an on-demand time to perform the maintenance of the CTU following a current activity of the CTU.

Using solutions according to some implementations of the present disclosure, adaptive maintenance can be performed on a CTU, where the serviceable life of the CTU until the next maintenance is extended so that the CTU can carry out its current operation, which can be a delivery of cargo, or a return to a home location.

Although reference is made to examples that assume driverless vehicles used to transfer CTUs, it is noted that in other examples, solutions according to some implementations of the present disclosure can be applied to CTUs that are transferred by vehicles driven by human drivers.

In accordance with some implementations of the present disclosure, as shown in FIG. 1, automated adjustment of an adjustable mechanical element 102 (or another component) of the CTU 100 can be performed. The adjustment of the adjustable mechanical element 102 is performed in the absence of any human driver at the CTU 100 in some examples.

Although just one adjustable mechanical element 102 is shown in FIG. 1, it is noted that in other examples, the CTU 100 can include multiple adjustable mechanical elements (or other components) that can be automatically adjusted, i.e., without input from a human driver of a vehicle that transfers the CTU 100.

As shown in FIG. 1, the CTU 100 is towed by a vehicle 104 (such as a tractor or other type of vehicle). In examples according to FIG. 1, the CTU 100 is separate from the vehicle 104, and the CTU 100 can be attached to a tow platform 106 of the vehicle 104 to allow the vehicle 104 to tow the CTU 100. In other examples, the vehicle 104 can be a truck, and the CTU 100 can be part of the truck 104. In further examples, the vehicle 104 can have a bed or other support structure on which the CTU 100 is placed.

In some examples, the vehicle 104 is a driverless vehicle. In alternative examples, the vehicle 104 can be driven by a human driver.

In some examples, the CTU 100 includes a CTU controller 108 that allows the CTU 100 to perform self-diagnosis and self-adjustment of the adjustable mechanical element 102. The CTU controller 108 can include a hardware processing circuit that can include any one or more of the following: a microprocessor, a core of a multi-core microprocessor, a microcontroller, a programmable gate array, a programmable integrated circuit device, or another type of hardware processing circuit. In further examples, the CTU controller 108 can include a combination of a hardware processing circuit and machine-readable instructions (software or firmware) executable on the hardware processing circuit.

Based on information from a sensor 118, the CTU controller 108 is able to detect a compromised condition of the adjustable mechanical element 102. The CTU controller is able to determine a time of performing a next maintenance of the CTU 100, based on maintenance schedule information 109, and can control adjustment of the adjustable mechanical element 102 in response to detecting the compromised condition and based on the time of performing the next maintenance of the CTU 100.

The maintenance schedule information 109 can store information relating to triggers that would cause scheduled maintenance of the CTU to be performed. As examples, the triggers can include any or some combination of the following: passage of a specified time duration, travel of the CTU for a specified distance, wear of a component past a specified wear threshold (e.g., tire tread worn by greater than a specified depth since a last measurement, brake pad or brake caliper worn by greater than a specified amount since a last measurement, etc.), or other triggers. The maintenance schedule information 109 can also store information of when the CTU can be next taken to a service facility for maintenance, which can be based on how long it would take for the CTU to travel to the service facility, and when the service facility is next available to accept the CTU for maintenance.

In examples according to FIG. 1, the CTU controller 108 provides a control indication 110 to an adjuster 112, which can perform adjustment of the adjustable mechanical element 102 in response to the control indication 110. The control indication 110 can include a control signal, a control message, an information element in a message, and so forth. In further examples, instead of being part of the CTU 100, the CTU controller 108 can be part of the vehicle 104, and can communicate with the CTU 100.

Although just one sensor 118 is shown in FIG. 1, it is noted that in other examples, there can be multiple sensors to measure characteristics of respective components of the CTU 100.

The sensor 110 can detect a wear of a component (such as the adjustable mechanical element 102) that can be worn over time due to use. Examples of such components include a component of a brake, a wheel, a tire, and so forth. A sensor for detecting tire wear can monitor an amount of tread left on the tire. The tire wear sensor can be an optical sensor that can detect reflected light (reflected by the tire in response to light emitted by a light source on the CTU 100 or ambient light) to determine a depth of the tire tread.

As another example, the tire wear sensor can include a camera (or multiple cameras) to capture an image of each tire of the CTU 100. The CTU controller 108 can process the captured image of each tire and determine the wear level of the camera.

Alternatively, the tire wear sensor can be attached to the tire, and after some level of wear, a signal can be generated by the sensor to indicate an amount of wear that has occurred. For example, the tire wear sensor can include tire wear indicators integrated into the rubber of a tire, such that when the tire wear indicators are exposed due to tire wear, a voltage change, a current change, or other signal change is triggered. Such a tire-mounted tire wear sensor can provide signals indicating multiple different levels of wear. If the tire wear sensor indicate that the wear of the tire has reached a point past a specified wear threshold (i.e., the depth of the tire tread is less than the specified wear threshold), then the CTU controller 108 can control adjustment of the tire. For example, the CTU controller 108 can cause the adjuster 112 to activate a tire lift mechanism, to lift the tire that has experienced excessive treat. As another example, the adjuster 112 can activate an axle lift mechanism, to lift an axle to which the worn tire is mounted. Lifting the worn tire results in the worn tire not being used during travel of the CTU 100. As another example, the CTU controller 108 can cause the adjuster 112 to reduce pressure in the tire that has experienced excessive tire wear, to prevent the likelihood of a blowout of the tire. For example, the adjuster 112 can include a gas pump that is able to inflate or deflate the pressure of the tire, by respectively injecting gas into the tire or removing gas from the tire.

In other examples, a wheel sensor can monitor wear of a wheel (also referred to as a "hub") on which a tire is mounted. The wheel includes bearings that allow the wheel to rotate relative to an axle to which the wheel is mounted. Over time, the bearings can wear out, which can lead to failure of the wheel or the tire mounted on the wheel. Worn bearings can lead to heating of the wheel due to friction. Worn bearings may cause the wheel to lock up, or the heat due to friction of the worn bearings can cause a tire blowout if the temperature of the wheel becomes too high. The wheel sensor can include a temperature sensor to detect a temperature of the wheel. If the temperature of the wheel exceeds a specified temperature threshold, then the wheel sensor can output an indication to the CTU controller 108, which can cause a corrective action to be taken. For example, the CTU controller 108 can cause the adjuster 112 to lift the wheel with the worn bearings, or lift the axle to which the wheel with the worn bearings is mounted.

In further examples, a brake sensor can detect wear of a component of a brake, such as a brake pad or a brake caliper. A brake caliper is actuated to squeeze a brake pad to cause a braking action of the CTU. Both the brake pad and the brake caliper are subject to wear due to use. A brake wear sensor can be used to detect an amount of wear of either the brake pad or the brake caliper or both. The brake wear sensor can include an optical sensor, or a sensor that is attached to the brake pad and/or brake caliper. If the wear of the brake component (brake caliper, brake pad, or both) exceeds a specified wear threshold, then the brake wear sensor can provide an indication to the CTU controller 108 that the brake component has experienced excessive wear.

In response to the indication of excessive wear of the brake component, the CTU controller 108 can cause the adjuster 112 to disable the brake component. The CTU 100 can have multiple brakes. Thus, when a brake that has experienced excessive wear is disabled, the remaining brakes can still be operational. As another example, instead of disabling the worn brake, pressure to the worn brake can be reduced, such as by reducing an amount of force that is applied by a brake caliper on a brake pad.

In other examples, other types of components that can be worn over time or with use can also be monitored and adjusted by the CTU controller 108 when excessive wear is detected.

In further examples, the sensor 118 can be a faulty operation sensor to detect faulty operation of a component of the CTU 100. For example, a fault of the brake can cause the brake to no longer function, or to function at a reduced capacity. The faulty brake may have been caused by leakage of a brake fluid, damage to a component (e.g., the brake pad or brake caliper) of the brake, or another cause. The faulty operation sensor can detect that the brake is no longer functioning or is functioning at reduced capacity, and can provide an indication to the CTU controller 108.

Another component that can experience faulty operation can include a suspension of the CTU 100. For example, the suspensions of the CTU 100 can include gas suspensions that rely on pumping of gas into each suspension to raise the chassis of the CTU 100 and to provide for a smooth ride quality of the CTU 100. A gas leak in a suspension can cause the suspension to sag, which is an example of a faulty operation of the sensor. A gas suspension fault sensor can detect the sagging of the gas suspension, or can detect reduced gas pressure of the gas suspension, and can provide an indication of the gas suspension fault to the CTU controller 108.

In other examples, the suspensions of the CTU 100 can include spring suspensions. Damage to the spring of a suspension can cause the suspension to sag, which can be detected by the suspension fault sensor.

In further examples, an aerodynamic shroud of the CTU 100 may be damaged. The aerodynamic shroud of the CTU 100 may normally be moved to different positions to adjust the amount of air friction experienced by the CTU 100 during travel. If a fault in the aerodynamic shroud prevents the aerodynamic shroud from being operated, then the CTU 100 may experience excessively high air friction at high speeds of travel. The sensor 118 can be an aerodynamic shroud sensor to detect whether the aerodynamic shroud has moved to a proper position when actuated. An indication of the fault of the aerodynamic shroud can be provided by the aerodynamic shroud sensor to the CTU controller 108.

In other examples, faulty operation of other components of the CTU 100 can be detected by sensors on the CTU 100.

In response to an indication of a fault of a component, the CTU controller 108 can take action to address the faulty suspension. For example, an axle on which a faulty brake or faulty suspension is located can be raised by the adjuster 112. As another example, the faulty brake can be disabled or its operation can be otherwise adjusted, such as by reducing a force applied by a brake caliper.

Although various examples of components that can experience wear or fault are discussed above, it is noted that the CTU 100 can include other components that can experience wear or fault.

More generally, disabling a component that has can experienced excessive wear or a fault (i.e., a component that has experienced a compromised condition) can include inactivating the component, such as by sending a control signal to the component to cause the component to no longer operate. In further examples, disabling the component can include moving the component to a position to prevent the component from being operated while other components of the CTU remain operational.

Adjusting the component that has experienced a compromised condition can include changing an operational setting of the component from a first setting to a different second setting, such as by reducing a pressure applied to a brake, reducing a pressure of a tire, raising an axle on which a tire or a faulty suspension is located, and so forth.

In some examples, whenever a component has experienced a compromised condition and/or an action has been taken to adjust the component, information can be provided by the CTU controller 108 to the vehicle 104 regarding the compromised condition of the component and/or the action that was taken to address the component with the compromised condition. More specifically, in some examples, such information is provided by the CTU controller 108 over a communication link (a wireless link or a wired link) to a vehicle controller 120 of the vehicle 104. The vehicle controller 120 can include a hardware processing circuit, or a combination of a hardware processing circuit and machine-readable instructions executable on the hardware processing circuit.

In some cases, the vehicle controller 120 can respond to such information from the CTU controller 108 by causing the vehicle controller 120 to adjust its operation to accommodate the component with the compromised condition. For example, the vehicle 104 can slow down its speed, to reduce the likelihood of tire blowout, to allow more time to brake when a brake has been disabled or adjusted, to address the issue of increased air friction due to a faulty aerodynamic shroud, and so forth. In the context of an autonomous (driverless) vehicle 104, the vehicle controller 120 can automatically adjust its operation based on the received information regarding the compromised condition of a component of the CTU 100. In the context of a vehicle 104 with a human driver, the human driver can be provided with a message (such as by the vehicle controller 120 on a display device in the vehicle 104) that allows the human driver to adjust the operation of the vehicle 104 if appropriate.

In response to an indication from the sensor 118 of a compromised condition of a component of the CTU 100, the CTU controller 108 can also send, through a communication transceiver 123 of the CTU 100, a notification to a remote target entity 122 over a network 116. The remote target entity 122 can include a server computer, a cloud, a human operator, and so forth. The notification can include a message (e.g., an email message, a text message), a voice call, or any other type of notification.

In other examples, the target entity to which the CTU controller 108 can send a notification of a compromised condition of a component of the CTU 100 can be the vehicle 104 (as discussed above) or another entity in the CTU 100.

The network 116 can be a wireless network in some examples, such as a cellular network, a wireless local area network (WLAN), and so forth. The communication transceiver 123 can communicate radio frequency (RF) signals over a wireless network, such as RF signals used in a cellular network or a WLAN.

An example cellular network can operate according to the Long-Term Evolution (LTE) standards as provided by the Third Generation Partnership Project (3GPP). The LTE standards are also referred to as the Evolved Universal Terrestrial Radio Access (E-UTRA) standards. In other examples, other types of cellular networks can be employed, such as second generation (2G) or third generation (3G) cellular networks, e.g., a Global System for Mobile (GSM) cellular network, an Enhanced Data rates for GSM Evolution (EDGE) cellular network, a Universal Terrestrial Radio Access Network (UTRAN), a Code Division Multiple Access (CDMA) 2000 cellular network, and so forth. In further examples, cellular networks can be fifth generation (5G) or beyond cellular networks. In additional examples, a wireless network can include a WLAN, which can operate according to the Institute of Electrical and Electronic Engineers (IEEE) 802.11 or Wi-Fi Alliance Specifications. In other examples, other types of wireless networks can be employed by the CTU controller 108 to communicate with a remote service, such as a Bluetooth link, a ZigBee network, and so forth. Additionally, some wireless networks can enable cellular IoT, such as wireless access networks according to LTE Advanced for Machine-Type Communication (LTE-MTC), narrowband IoT (NB-IoT), and so forth.

In further examples, in response to detecting a compromised condition of a component of the CTU 100, the CTU controller 108 can provide a notification of a reduction of a load capacity of the CTU 100. The notification can be sent to the vehicle controller 120 (or to a driver of the vehicle 104), to cause the vehicle 104 (either the vehicle controller 120 or a driver) to not accept cargo loading of the CTU 100 from exceeding a specified weight. In the CTU 100 without a compromised component, the CTU 100 may accept cargo loading up to a first specified weight. Once a component having a compromised condition is detected, then the CTU 100 may accept cargo loading up to a second specified weight that is less than the first specified weight. Thus, for example, once the amount of cargo that is already loaded into the CTU 100 is at or near the specified second weight, the vehicle 104 can deny any further requests for loading cargo into the CTU 100, even if the CTU 100 has additional capacity to receive additional cargo.

In additional examples, in response to detecting a compromised condition of a component of the CTU 100, the CTU controller 108 can provide a notification of a reduction of a load capacity of the CTU 100 to the remote target entity 122, which can be a server or a human administrator that is able to schedule loading of cargo onto the CTU 100. Based on the notification of a reduction of a load capacity of the CTU 100 (or alternatively, based on a notification of a compromised condition of a CTU component), the remote target entity 122 can take steps to reduce the cargo loading of the CTU 100.

Although FIG. 1 shows the sensor 118 as being part of the CTU 100, it is noted that in other examples, the sensor 118 can be part of the vehicle 104, and a communication link is provided between the vehicle 104 and the CTU 100 to communicate measurement information from the sensor 118 to the CTU controller 108. In examples where there are multiple sensors 118, one or more sensors can be part of the CTU 100, and one or more other sensors can be part of the vehicle 104.

In the ensuing discussion, when reference is made to a "sensor of the CTU," that can refer to either a sensor on the CTU 100, or a sensor of the vehicle 104 to which the CTU 100 is attached, mounted, or part of.

Figure 2:
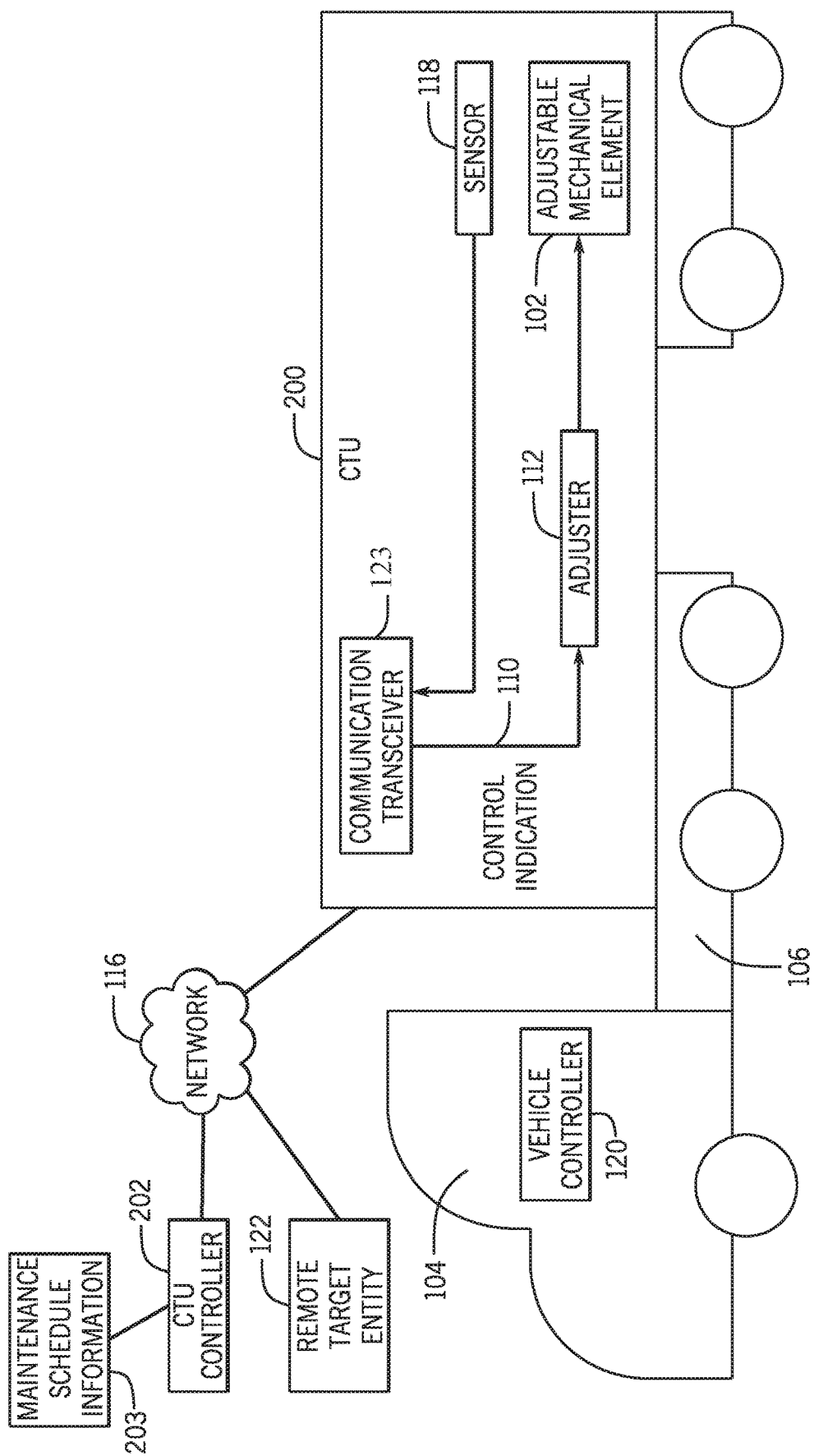
FIG. 2 is a block diagram of another example arrangement including a CTU, a vehicle attached to the CTU, and a remote controller, according to further implementations.

FIG. 1 shows examples where the CTU controller 108 is part of the CTU 100. As shown in FIG. 2, in alternative examples, a CTU 200 is provided without an internal controller such as the CTU controller 108 of FIG. 1. In examples according to FIG. 2, a CTU controller 202 that is remotely located from the CTU 200 can be employed (the CTU controller 202 is referred to as a "remote CTU controller 202"). For example, the remote CTU controller 202 can be part of a central system that includes one or more computers. The central system can include a server system that has one or more server computers, a cloud system, and so forth.

The CTU controller 202 is able to communicate over the network 116 with the CTU 200. In such examples, the communication transceiver 123 of the CTU 200 can transmit information regarding the CTU 200 over the network 116 to the remote CTU controller 202, and the remote CTU controller 202 can use the information provided by the CTU 200 as well as maintenance schedule information 203 (which is similar to the maintenance schedule information 109 of FIG. 1) to perform controlling of the adjuster 112 to control the adjustable mechanical element 102. Based on sensor information received from the CTU 200, the CTU controller 202 is able to determine a compromised condition of a component of the CTU 200, and can control adjustment of the component based on the maintenance schedule information 203. The CTU controller 202 is able to generate a control indication that is transmitted by the CTU controller 202 over the network 116 to the CTU 200. The control indication received through the communication transceiver 123 of the CTU 200 is provided as the control indication 110 to the adjuster 112 to adjust the adjustable mechanical element 102.

The remote CTU controller 202 can send notifications to the vehicle controller 120 and/or to the remote target entity 122 over the network 116, similar to the notifications discussed above in connection with FIG. 1.

Figure 3:
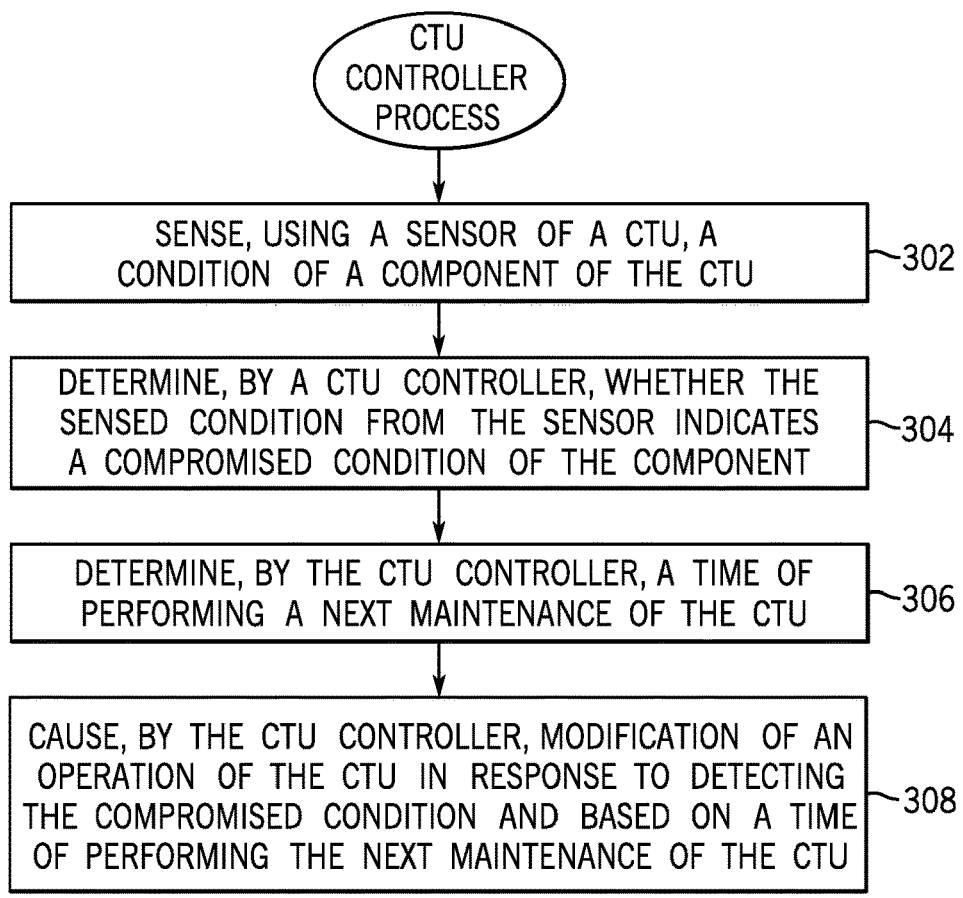
FIG. 3 is a flow diagram of an example process of a controller, according to some implementations.

FIG. 3 is a flow diagram of a process according to some examples. The process includes sensing (at 302), using a sensor (e.g., 118 in FIG. 1 or 2) of a CTU (e.g., 100 or 200 in FIG. 1 or 2), a condition of a component of the CTU. A CTU controller (e.g., 108 or 202 in FIG. 1 or 2) determines (at 304) whether the sensed condition from the sensor indicates a compromised condition of the component. The CTU controller determines (at 306) a time of performing a next maintenance of the CTU. The time of performing a next maintenance of the CTU can refer to a scheduled time, such as a regularly scheduled time for performing maintenance of the CTU, or a time that is requested or set on demand, such as in response to detecting a compromised condition of a component. The time of the next maintenance of the CTU can be based on an amount of time for the CTU to travel to a service facility, and the time that the service facility is available to receive the CTU for maintenance.

The CTU controller causes (at 308) modification of an operation of the CTU in response to detecting the compromised condition and based on a time of performing the next maintenance of the CTU. As explained above, the modifying of the operation of the CTU can involve adjusting a component in the CTU.

In further examples, the modifying of the operation of the CTU can include setting a reduced load capacity of the CTU, such that the CTU would be loaded with a smaller amount of cargo.

In additional examples, the modifying of the operation of the CTU can include sending a notification to a vehicle (e.g., the vehicle 104 of FIG. 1 or 2) to cause the vehicle to adjust its operation (e.g. reduce its speed) such that the operation of the CTU (e.g., the speed of the CTU) is also adjusted correspondingly.

In further examples, in addition to causing modification of operation of the CTU in response to a compromised condition of a CTU component, the CTU controller can also automatically set an appointment to maintain the CTU with a service facility. Additionally, the CTU controller can order one or more parts to repair the CTU component in response to detecting the compromised condition of the CTU component, such that the one or more parts to fix the CTU component are available when the CTU is taken to the service facility for maintenance. This can reduce an amount of downtime of the CTU associated with performing maintenance, since ordering part(s) ahead of time can increase the likelihood that the part(s) are available once the CTU is taken in for maintenance.

Figure 4:
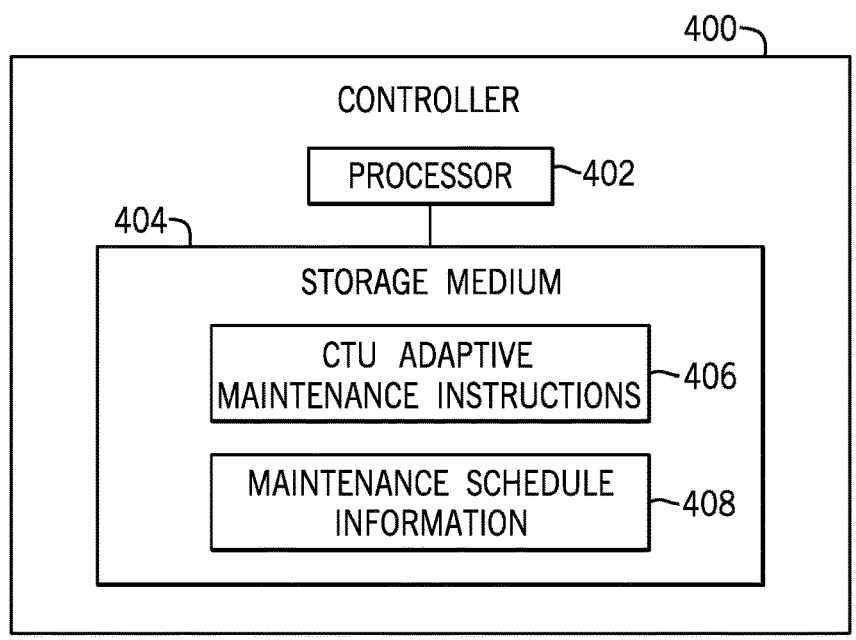
FIG. 4 is a block diagram of a controller according to some implementations.

FIG. 4 is a block diagram of an example controller 400 (e.g., the CTU controller 108 of FIG. 1, the CTU controller 202 of FIG. 2, or the vehicle controller 120 of FIG. 1 or 2). The controller 400 includes a processor 402 (or multiple processors), where a processor can be a hardware processing circuit. The controller 400 further includes a non-transitory or computer-readable storage medium 404 that stores CTU adaptive maintenance instructions 406 that are executable on the processor 402 to perform various tasks as discussed in the present disclosure. The storage medium 404 also stores maintenance schedule information 408 (e.g., 109 in FIG. 1 or 203 in FIG. 2) that can be used by the CTU adaptive maintenance instructions 406 to adjust an operation of the CTU.

The storage medium 404 can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A controller comprising:
at least one processor configured to:
detect a compromised condition of a component of a cargo transportation unit (CTU);
determine a time of performing a next maintenance of the CTU based on an amount of time for the CTU to travel to a service facility; and
control adjustment of the component in response to detecting the compromised condition and based on the determined time of performing the next maintenance of the CTU, the adjustment of the component to extend a serviceable life of the component until the determined time of performing the next maintenance of the CTU.

2. The controller of claim 1, wherein the compromised condition of the component comprises wear of the component exceeding a wear threshold.

3. The controller of claim 1, wherein the compromised condition of the component comprises a faulty operation of the component.

4. The controller of claim 1, wherein extending the serviceable life of the component is to extend a time for the CTU to deliver cargo to one or more destinations before the determined time of performing the next maintenance of the CTU.

5. The controller of claim 1, wherein the adjustment of the component comprises disabling the component.

6. The controller of claim 5, wherein disabling the component comprises inactivating the component.

7. The controller of claim 5, wherein disabling the component comprises moving the component to a position to prevent the component from being operated while other components of the CTU are operational.

8. The controller of claim 5, wherein disabling the component comprises lifting a wheel of the CTU in response to detecting the compromised condition.

9. The controller of claim 1, wherein the at least one processor is configured to further:
send, over a network, a notification to a target entity, in response to detecting the compromised condition.

10. The controller of claim 1, wherein the at least one processor is configured to further:
detect a compromised condition of a second component of the CTU; and
provide a notification of a reduction of a load capacity of the CTU, in response to detecting the compromised condition of the second component.

11. A method comprising:
sensing, using a sensor of a cargo transportation unit (CTU), a condition of a component of the CTU;
determining, by a controller, whether the sensed condition from the sensor indicates a compromised condition of the component;
determining, by the controller, a time of performing a next maintenance of the CTU based on an amount of time for the CTU to travel to a service facility; and
causing, by the controller, a modification of an operation of the CTU in response to detecting the compromised condition and based on the determined time of performing the next maintenance of the CTU, the modification of the operation of the CTU extending a serviceable life of the component until the determined time of performing the next maintenance of the CTU.

12. The method of claim 11, wherein the modification of the operation of the CTU comprises adjusting or disabling the component.

13. The method of claim 11, wherein the modification of the operation of the CTU comprises setting a reduced load capacity of the CTU.

14. The method of claim 11, wherein the modification of the operation of the CTU comprises lifting a wheel of the CTU that disables the component.

15. The method of claim 14, wherein the modification of the operation of the CTU comprises reducing a speed of the CTU, the method further comprising:
sending, by the controller to a vehicle transferring the CTU, a notification to cause the vehicle to reduce a speed of the vehicle to correspondingly reduce the speed of the CTU.

16. The method of claim 11, wherein determining the time of performing the next maintenance of the CTU is further based on when the service facility is available to receive the CTU for maintenance.

17. The method of claim 11, further comprising:
ordering, by the controller, a part for repairing the component in response to determining the compromised condition of the component.

18. A non-transitory machine-readable storage medium storing instructions that upon execution cause a controller to:
detect a compromised condition of a component of a cargo transportation unit (CTU);
determine a time of performing a next maintenance of the CTU based on an amount of time for the CTU to travel to a service facility; and
cause adjustment of the component in response to detecting the compromised condition and based on the determined time of performing the next maintenance of the CTU, the adjustment of the component to extend a serviceable life of the component until the determined time of performing the next maintenance of the CTU.

19. The controller of claim 1, wherein determining the time of performing the next maintenance of the CTU is further based on when the service facility is available to receive the CTU for maintenance.

20. The non-transitory machine-readable storage medium of claim 18, wherein determining the time of performing the next maintenance of the CTU is further based on when the service facility is available to receive the CTU for maintenance.

* * * * *